United States Patent [19]

Schutten et al.

[11] Patent Number: 4,716,336
[45] Date of Patent: Dec. 29, 1987

[54] LUMINESCENT SCREEN AND LOW-PRESSURE MERCURY VAPOR DISCHARGE LAMP PROVIDED WITH SUCH A SCREEN

[75] Inventors: Evert D. Schutten, Roosendaal; Johannus G. Verlijsdonk, Eindhoven, both of Netherlands

[73] Assignee: U.S. Philips Corporation, New York, N.Y.

[21] Appl. No.: 869,749

[22] Filed: Jun. 2, 1986

[30] Foreign Application Priority Data

Jun. 4, 1985 [NL] Netherlands ............... 8501600

[51] Int. Cl.$^4$ ............................................. C09K 11/475
[52] U.S. Cl. .............................. 313/486; 252/301.4 F; 428/690
[58] Field of Search ............... 252/301.4 F; 313/486; 428/690

[56] References Cited

U.S. PATENT DOCUMENTS 3,523,091 8/1970 McAllister ............... 252/301.4 F
3,758,413 9/1973 Peters ...................... 252/301.4 F
4,215,289 7/1980 Dettair et al. ............. 252/301.4 F X

FOREIGN PATENT DOCUMENTS 1039951 9/1983 U.S.S.R. ...................... 252/301.4 F

OTHER PUBLICATIONS

Kroger "Some Aspects of the Luminescence of Solids", Elsevier Publish. Co., 1948, pp. 287, 288.
Peters I "J. Electrochem. Soc.", pp. 985–989, 1969.

Primary Examiner—Jack Cooper
Attorney, Agent, or Firm—John C. Fox

[57] ABSTRACT

A luminescent screen provided with a zirconium- and-/or terbium-activated silicate having an apatite crystal structure according to the formula

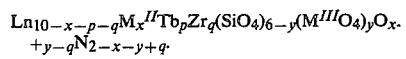
$$Ln_{10-x-p-q}M^{II}_x Tb_p Zr_q (SiO_4)_{6-y}(M^{III}O_4)_y O_{x+y-q} N_{2-x-y+q}.$$

In this formula, Ln is at least one of the elements Y, La and Gd. $M^{II}$ is Mg, Ca and/or Sr and $M^{III}$ is Al and/or B. It further holds that:

| | |
|---|---|
| $0 \leq x \leq 1.9$ | $0 \leq p \leq 3$ |
| $0 \leq y \leq 1.9$ | $0 \leq q \leq x + y$ |
| $x + y \leq 1.9$ | $0.1 \leq p + q$ |

8 Claims, 3 Drawing Figures

LUMINESCENT SCREEN AND LOW-PRESSURE MERCURY VAPOR DISCHARGE LAMP PROVIDED WITH SUCH A SCREEN

BACKGROUND OF THE INVENTION

The invention relates to a luminescent screen provided with a luminescent layer which is formed on a carrier and comprises a luminescent silicate having an apatite crystal structure. The invention further relates to a low-pressure mercury vapour discharge lamp provided with such a luminescent screen.

The Netherlands Patent Application No. 8006223 laid open to public inspection discloses luminescent screens comprising luminescent silicates of an alkaline earth metal and of a rare earth metal, these silicates having the hexagonal apatite crystal structure and corresponding to the general formula $Me_aLn_b(AO_4)_6X_2$. In this formula $9 \leq a+b \leq 10$ and Ln represents gadolinium and, as the case may be, yttrium and/or lanthanum. Me is an alkaline earth metal, such as Ca, Sr, Ba, Mg and Zn, while A represents silicon, phosphorus and/or boron. X represents halogen, oxygen and, as the case may be, vacant sites. These known luminescent silicates are activated by lead or by lead and terbium and/or manganese. Such luminescent silicates, which, however, do not contain gadolinium and are activated by antimony, lead, tin, antimony and manganese or lead and manganese, are also described in the Netherlands published Patent Application 7005708, corresponding to U.S. Application Ser. No. 345,444, filed Mar. 27, 1973, now abandoned.

The element terbium is a frequently used activator for luminescent materials because it gives rise in many crystal lattices to a very efficient luminescence, in which the characteristic green $Tb^{3+}$ emission is produced. Upon excitatinn by ultraviolet radiation, however, it is required for obtaining an efficient luminescence that the luminescent material is excited by radiation having a wavelength lying at the maximum or very close to the maximum of the excitation spectrum of the material.

An important application of such materials is found in low-pressure mercury vapour discharge lamps. In such lamps, mainly ultraviolet radiation having a wavelength of about 254 nm is produced. A great disadvantage of many Tb-activated materials is that the maximum of the excitation band of the terbium is found at wavelengths lying comparatively far from 254 nm. In those cases, an efficient luminescence can be obtained only if the excitation energy is first absorbed in a second activator, after which this energy is transferred to the terbium. During this absorption and transfer, of course losses may occur.

The invention has for its object to provide luminescent screens comprising new luminescent materials and more particularly materials which are activated by terbium and which can be directly excited in the terbium.

SUMMARY OF THE INVENTION

According to the invention, a luminescent screen of the kind mentioned in the opening paragraph is characterized in that the silicate corresponds to the formula

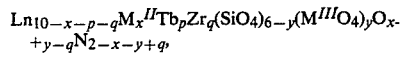

where Ln represents at least one of the elements Y, La and Gd, $M^{II}$ represents at least one of the elements Mg, Ca and Sr and $M^{III}$ represents at least one of the elements Al and B and where $0 \leq x \leq 1.9$ $0 \leq y \leq 1.9$ $x+y \leq 1.9$ $0 \leq p \leq 3$ $0 \leq q \leq x+y$ $0.1 \leq p+q$.

It has been found that nitrogen containing silicate apatites on the basis of the lattice $Ln_{10}(SiO_4)_6N_2$ where Ln represents the elements Y, La and/or Gd, form luminescent materials upon a suitable activation. Materials having a very efficient luminescence upon excitation especially by ultraviolet radiation are obtained with the activator elements terbium and zirconium, which are substituted at Ln sites. The apatite fundamental lattices $Ln(SiO_4)_6N_2$ are known per se; see, for example, Rev. Chim. Miner., 1975, 12 (3), 259–67 and J. Mater. Sci., 1976, 11 (7) 1305-9.

It has been found that in these lattices the Ln can be partly replaced by one or more of the elements Mg, Ca and Sr and the Si can be partly replaced by Al and/or B, whilst the apatite crystal structure remains unchanged. With both substitutions, the same molar quantity of N has to be replaced by O in order to obtain a charge compensation. It has been found that a continuous sequence of compounds with decreasing nitrogen content is possible between the compound $Ln_{10}(SiO_4)_6N_2$ and the compounds only containing oxygen $Ln_8M^{II}_2(SiO_4)_6O_2$ and $Ln_{10}(SiO_4)_4(M^{III}O_4)_2O_2$. It has been found that the nitrogen-containing silicates and the silicates only contianing oxygen have a different excitation spectrum upon activation by terbium. A great advantage of the terbium-activated silicates according to the invention is that by a suitable choice of the N-to-O ratio the location of the maximum of the excitation spectrum can be adapted within certain limits to a value desired for a given application.

It appears from the aforementioned formula and conditions for the luminescent silicates of luminescent screens according to the invention that at most 1.9 mol of the Ln can be replaced by Mg, Ca and/or Sr ($x \leq 1.9$) and also at most 1.9 mol of the $SiO_4$ can be replaced by $AlO_4$ and/or $BO_4$($y \leq 1.9$). If at the same time substitutions of both Ln and $SiO_4$ take place, these substitutions altogether are also at most 1.9 ($x+y \leq 1.9$). In fact it is necessary that the luminescent silicate contains a minimum quantity of nitrogen (0.1 mol of N per mol of silicate). Upon activation by only Tb (q=0), the terbium content p is at least 0.1 because at smaller values of p too low luminous fluxes are obtained due to too low an absorption of exciting radiation. The terbium content is at most 3 because at higher values too small luminous fluxes are obtained due to concentration quenching. The terbium-activated silicates have the characteristic green line emission of $Tb^{3+}$. Experiments which have led to the invention further have shown that upon activation by tetravalent zirconium, luminescent silicates are obtained which luminesce efficiently in a band in the deep blue to near ultraviolet part of the spectrum. With a partial substitution of the $Ln^{3+}$ ions by the tetravalent Zr ions, an equimolar quantity of the Ln has to be replaced by $M^{II}$ and/or an equimolar quantity of the $SiO_4$ has to be replaced by $M^{III}O_4$. The zirconium content q is chosen to lie between the values 0.1 and 1.9 (the maximum value of the overall $M^{II}$- and/or $M^{III}O_4$ substitution).

Upon activation by zirconium, the optimum results are obtained if yttrium is chosen for Ln. Therefore, luminescent screens are preferred which are characterized in that Ln is yttrium and p=0.

Upon activation by terbium, it is advantageous to use silicates in which lanthanum is chosen for Ln. These luminescent silicates in fact have a high quantum efficiency and a very high absorption of the exciting radiation, especially when used in low-pressure mercury vapour discharge lamps, as a result of which high luminous fluxes can be obtained. A partial substitution of Ln by $M^{II}$ and/or of $SiO_4$ by $BO_4$ in these silicates further leads to an increase of the quantum efficiency. Therefore, luminescent screens according to the invention are preferred, which are characterized in that the silicate corresponds to the formula

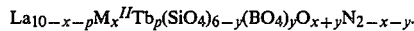

$La_{10-x-p}M_x^{II}Tb_p(SiO_4)_{6-y}(BO_4)_yO_{x+y}N_{2-x-y}.$

With such screens the optimum results are obtained if lanthanum, which is replaced in part by gadolinium, is chosen for Ln in the silicate. These terbium-activated silicates in fact have the highest quantum efficiency. A preferred embodiment of a luminescent screen according to the invention is therefore characterized in that the silicate corresponds to the formula

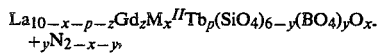

$La_{10-x-p-z}Gd_zM_x^{II}Tb_p(SiO_4)_{6-y}(BO_4)_yO_{x+y}N_{2-x-y},$ in which $0.5 \leq z \leq 5.0.$ An advantageous application of the luminescent screens is found in low-pressure mercury vapour discharge lamps because in these lamps the luminescent silicates are excited to the optimum. The maximum of the excitation spectrum of the silicates in fact can be adequately adapted by a suitable choice of the O-to-N ratio to the 254 nm radiation produced in these lamps.

The luminescent silicates can be obtained by a solid state reaction at a high temperature of a mixture of starting materials formed from oxides of the constituent elements or from compounds yielding these oxides upon an increase in temperature. The nitrogen is mostly added to the mixture as $Si_3N_4$, wherein in general an excess of nitrogen, for example, of a few tens of mol.%, is used. Likewise a small excess of silicon, for example of about 10 mol. %, can be used to favour the procedure of the solid-state reaction. The mixture is heated once or several times at a temperature of 1200° to 1700° C. in a weakly reducing atmosphere, the luminescent silicate thus being formed.

BRIEF DESCRIPTION OF THE DRAWING

Embodiments of the luminescent silicates suitable for a luminescent screen according to the invention will now be described more fully with reference to a drawing, an example of preparation and a number of measurements.

In the drawing.

DESCRIPTION OF THE PREFERRED EMBODIMENTS

Figure 1:
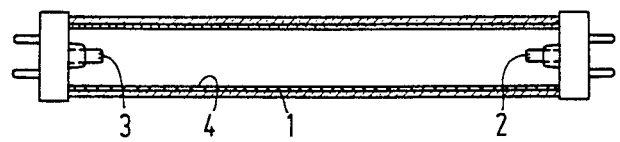
FIG. 1 shows a low-pressure mercury vapour discharge lamp according to the invention.

FIG. 1 shows diagrammatically and in sectional view a low-pressure mercury vapour discharge lamp provided with a tubular glass wall 1. At the ends of the lamp there are arranged electrodes 2 and 3, between which the discharge is maintained during operation. The lamp is provided with a small quantity of mercury and with a rare gas as a starting gas. The wall 1 constitutes the carrier for a luminescent screen and is provided at the inner surface with a luminescent layer 4, which comprises a luminescent silicate according to the invention. The layer 4 can be applied to the wall 1 in a usual manner, for example by means of a suspension comprising the luminescent silicate.

EXAMPLE 1

Figure 2:
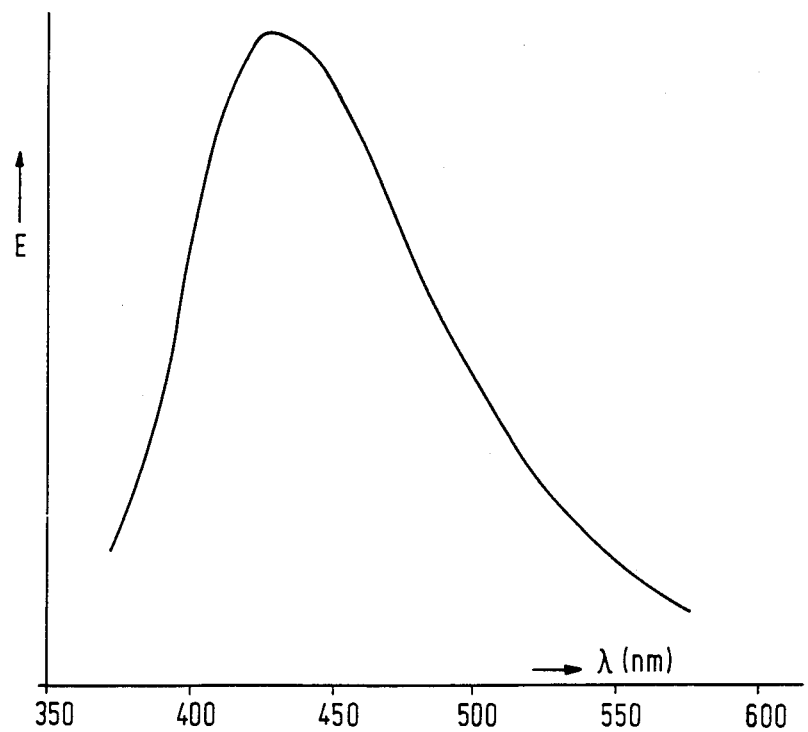
FIG. 2 shows the spectral energy distribution of the emission of a zirconium-activated silicate.

A mixture was made of
0.648 g of $CaCO_3$
5.847 g of $Y_2O_3$ 1.672 g of $SiO_2$
0.636 g of $Si_3N_4$
2.086 g of $ZrOCl_2.8H_2O.$ This mixture was heated in a crucible of $Al_2O_3$ for one hour at 1300° C. in a closed furnace, through which was passed a flow (5.0 liters/min) of nitrogen containing 5% by volume of hydrogen. After cooling and pulverization, the product obtained was heated once more for one hour at 1400° C. in the same atmosphere. After cooling and homogenization, a zirconium-activated silicate was obtained according to the formula $ZrCaY_8(SiO_4)_6N_2.$ It was shown by X-ray diffraction analysis that this silicate (like all following examples of luminescent silicates according to the invention) had the apatite crystal structure. Upon excitation by short-wave ultra-violet radiation (mainly 254 nm), the silicate showed a blue emission in a band having a maximum at about 425 nm and a half-value width of about 105 nm. The spectral energy distribution of this emission is shown in FIG. 2. In this Figure, the wavelength λ in nm is plotted on the abscissa and the relative radiation intensity E in arbitrary units is plotted on the ordinate. The silicate had a quantum efficiency of 47%, while the absorption of the exciting 254 nm radiation was 75%.

EXAMPLES 2 to 18

Figure 3:
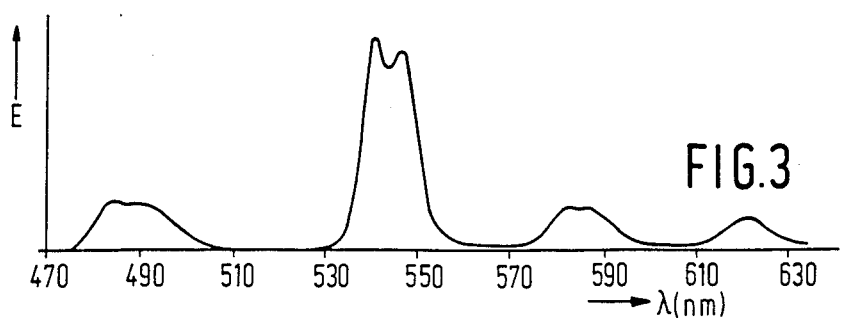
FIG. 3 shows the emission spectrum of a terbium-activated silicate.

In a manner similar to that described in Example 1, a number of terbium-activated luminescent silicates of different compositions were prepared. The required terbium was added to the starting mixture as $Tb_4O_7$. The formulae of these silicates and the results of the measurement of the quantum efficiency (QE in %) upon excitation by 254 nm radiation and the absorption (A in %) of the exciting radiation are indicated in the following Table. The emission of these silicates is the characteristic $Tb^{3+}$ line emission. FIG. 3 shows the spectral energy distribution of the emission of the silicate according to Example 2.

| example | formula | A | QE |
|---|---|---|---|
| 2 | $Y_9Tb(SiO_4)_6N_2$ | 88 | 66 |
| 3 | $La_9Tb(SiO_4)_6N_2$ [(1)] | 93 | 62 |
| 4 | $Gd_{8.5}Tb_{1.5}(SiO_4)_6N_2$ | 89 | 56 |
| 5 | $Y_{7.5}MgTb_{1.5}(SiO_4)_6ON$ | 72 | 72 |
| 6 | $Y_{7.5}CaTb_{1.5}(SiO_4)_6ON$ | 64 | 77 |
| 7 | $Y_{7.5}SrTb_{1.5}(SiO_4)_6ON$ | 71 | 76 |
| 8 | $La_{7.5}CaTb_{1.5}(SiO_4)_6ON$ | 87 | 75 |
| 9 | $La_{7.5}SrTb_{1.5}(SiO_4)_6ON$ | 87 | 76 |
| 10 | $Y_{8.5}Tb_{1.5}(SiO_4)_5(AlO_4)ON$ | 82 | 73 |
| 11 | $La_9Tb(SiO_4)_{5.5}(AlO_4)_{0.5}O_{0.5}N_{1.5}$ | 90 | 61 |
| 12 | $La_9Tb(SiO_4)_5(AlO_4)ON$ | 90 | 62 |
| 13 | $La_9Tb(SiO_4)_5(BO_4)ON$ [(1)] | 87 | 72 |
| 14 | $La_{8.5}Tb_{1.5}(SiO_4)_5(BO_4)ON$ | 89 | 78 |
| 15 | $La_{8.5}Tb_{1.5}(SiO_4)_{4.75}(BO_4)_{1.25}O_{1.25}N_{0.75}$ | 86 | 80 |
| 16 | $La_{8.5}Tb_{1.5}(SiO_4)_{4.5}(BO_4)_{1.5}O_{1.5}N_{0.5}$ | 81 | 81 |
| 17 | $La_{8.5}Tb_{1.5}(SiO_4)_{4.25}(BO_4)_{1.75}O_{1.75}N_{0.25}$ | 74 | 80 |
| 18 | $La_{6.5}Gd_2Tb_{1.5}(SiO_4)_{4.5}(BO_4)_{1.5}O_{1.5}N_{0.5}$ | 78 | 83 |

[(1)]The maximum of the excitation spectrum of the silicates according to Example 3: $La_9Tb(SiO_4)_6N_2$ and according to Example 13: $La_9Tb(SiO_4)_5(BO_4)ON$ and of the silicate only containing oxygen (not in accordance with the invention): $La_9Tb(SiO_4)_4(BO_4)_2O_2$ is found at: 257, 240 and 236 nm, respectively.

What is claimed is:

1. A luminescent screen provided with a luminescent layer which is formed on a carrier and which comprises a luminescent silicate having an apatite crystal structure, characterized in that the silicate corresponds to the formula:

$$Ln_{10-x-p-q}M^{II}_xTb_pZr_q(SiO_4)_{6-y}(M^{III}O_4)_yO_{x+y-q}N_{2-x-y+q},$$

where Ln represents at least one of the elements Y, La and Gd, $M^{II}$ represents at least one of the elements Mg, Ca and Sr and $M^{III}$ represents at least one of the elements Al and B and where $0 \leq x \leq 1.9$ $0 \leq y \leq 1.9$ $x + y \leq 1.9$ $0 \leq p \leq 3$ $0 \leq q \leq x + y$ $0.1 \leq p + q.$ 2. A low pressure mercury vapour discharge lamp provided with a luminescent screen as claimed in claim 1.

3. A luminescent screen as claimed in claim 1, characterized in that Ln is yttrium and p=0.

4. A low pressure mercury vapour discharge lamp provided with a luminescent screen as claimed in claim 3.

5. A luminescent screen as claimed in claim 1, characterized in that the silicate corresponds to the formula $$La_{10-x-p}M^{II}_xTb_p(SiO_4)_{6-y}(BO_4)_yO_{x+y}N_{2-x-y}.$$

6. A low pressure mercury vapour discharge lamp provided with a luminescent screen as claimed in claim 5.

7. A luminescent screen as claimed in claim 1 characterized in that the silicate corresponds to the formula $$La_{10-x-p-z}Gd_zM^{II}_xTb_p(SiO_4)_{6-y}(BO_4)_yO_{x+y}N_{2-x-y},$$

where $0.5 \leq z \leq 5.0.$

8. A low-pressure mercury vapour discharge lamp provided with a luminescent screen as claimed in claim 7.

* * * * *